United States Patent Office 2,980,668
Patented Apr. 18, 1961

2,980,668
NEW ORGANIC SULPHONAMIDO ISOTHIOCYANATES

Herbert Aubrey Stevenson, John Ray Marshall, and Anthony Frederick Hams, Nottingham, England, assignors to Boots Pure Drug Company Limited, Nottingham, England, a British company No Drawing. Filed Jan. 29, 1957, Ser. No. 636,873

Claims priority, application Great Britain Feb. 3, 1956

11 Claims. (Cl. 260—239.8)

This invention relates to new organic isothiocyanates which have been found to possess valuable properties.

The invention consists in compounds of the general formula:

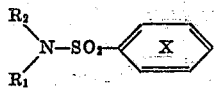

in which the phenyl nucleus X is substituted by at least one isothiocyanato radical, $R_1$ is hydrogen or an alkyl radical, $R_2$ is an alkyl radical, an alkyl radical containing a phenyl substituent, a cycloalkyl radical, an alkenyl radical, a phenyl radical or a phenyl radical containing one or more halogen atoms, alkyl, alkoxy or nitro radicals as substituents, or $R_1$ and $R_2$ together with the nitrogen atom represent a heterocyclic radical as hereinafter defined.

We have now found that dusts, dispersions, emulsions, smokes and aerosols of the compounds of the above general Formula I have properties which render them valuable for the control of fungi for example *Venturia inaequalis*, *Botrytis cinerea*, *Sclerotinia fructigena*, *Tilletia caries*, *Pythium debaryanum*, *Corticium solani*, *Podosphaera leucotricha* and *Cladosporium fulvum*. Our invention consists therefore in the compounds of the above general Formula I and in compositions which contain as active ingredient a compound of the above general formula together with a diluent or carrier.

The compounds of the invention may be prepared by methods which are well-known in the art for the synthesis of organic isothiocyanates. Thus the compounds of the invention may be prepared by the action of thiophosgene on the corresponding amines of the general formula:

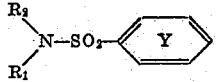

in which $R_1$ and $R_2$ are as hereinbefore defined and the phenyl nucleus Y is substituted by at least one amino group. The thiophosgene may be used as such or prepared in situ preferably by reduction of trichloro methanesulphenyl chloride with stannous chloride as described by Connolly and Dyson (J.C.S. 1935, p. 679).

The heterocyclic radical designated by

in the above general formulae may be derived from a heterocyclic compound containing a secondary nitrogen atom, such as for example, piperazine, morpholine and partially or completely reduced pyridine and pyrrole compounds.

The dispersions having a solid dispersed phase according to the invention may comprise the active ingredient in combination with a dispersing agent and/or a suspending agent in aqueous medium. For convenience the preparation may consist of active ingredient admixed with a dispersing agent and/or a suspending agent such that a dispersion is formed when the mixture is added to water. To facilitate the formation of a dispersion in this manner, the preparation to be diluted may also contain a water-miscible organic solvent, for example, acetone. The dispersions according to the invention also include suspensions in which the solid dispersed phase is admixed with an aqueous oil emulsion, the active ingredient being substantially insoluble in the oil thereof, which oil is preferably a non-volatile oil, for example, liquid paraffin. In such compositions the diluent or carrier comprises a dispersing and/or suspending agent, an emulsifying agent and a non-volatile oil.

The emulsions according to the invention may comprise the active ingredient in combination with an emulsifying agent and organic solvent, for example, xylene or an aromatic solvent boiling within the range 80–300° C. It may be advantageous to add a non-volatile vegetable or mineral oil such as liquid paraffin to act as an activator and/or sticker. The emulsion composition according to the invention may also contain a wetting agent. For convenience the composition may consist of the active ingredient admixed with or in solution in an organic solvent as hereinbefore specified together with an emulsifying agent, and if desired, a wetting agent such that an emulsion is formed on admixing the composition with water. Such compositions also form part of the present invention. The aqueous dispersions and emulsions herein described may be diluted with water before application to obtain a final concentration of the active ingredient within the range 0.001–10% w./v. but the invention is not limited to compositions which contain this concentration of the active ingredient; the concentration of the solutions which are employed depends upon the requirements of the particular spraying machine which is to be used.

Dispersions of the active ingredient in which the carrier is a pulverulent solid diluent also form part of the present invention. Such disersions may contain up to 50% w./v. of the active ingredient.

We have found that it is possible to employ the compound of the invention in the form of smokes and aerosols. This method of application is very convenient when the plants, which it is desired to treat for the control of the fungi, are located in an enclosed area, for example, in a greenhouse.

Accordingly our invention also comprises compositions for the preparation of fungicidal smokes and aerosols which contain as active ingredient a compound of the general Formula I.

In the preparation of compositions suitable for dispersion as aerosols which contain as active ingredient compounds of the above general Formula I, the active ingredient may be dissolved in a volatile solvent such as acetone. Alternatively the active ingredient may be dissolved in a high boiling aromatic solvent such as xylene or a non-volatile oil such as vegetable oil together with a supplementary solvent such as cyclohexanone or acetone if desired. Such compositions are readily dispersed as aerosols either by mechanical means or by incorporating therein a volatile propellant such as Freon (a mixture of chlorofluoro derivatives of methane and ethane).

Compositions suitable for the generation of fungicidal smokes comprise the active ingredient in association with an ignitable slow burning composition such that a smoke containing the active ingredient is generated on ignition.

The wetting and emulsifying agents which are employed in the compositions of the invention should preferably be free of amino groups and alcoholic groups so as to avoid the possibility of condensation taking place between the active ingredient and one of the aforementioned groups with the formation of thioureas and thiourethanes respectively.

In the case of compositions which are to be subjected to prolonged storage and which contain a compound of the invention dissolved in an organic solvent the latter should preferably be substantially anhydrous as the presence of water in such solutions tends to cause hydrolysis of the active ingredients on storage.

Other insecticides and fungicides such as D.D.T. benzene hexachloride and sulphur may be incorporated in the compositions of the invention before application of the latter to the plants.

The compounds of the invention have been demonstrated to possess funcigidal activity in tests carried out in the following manner:

LABORATORY TESTS (1) *Spore germination test.*—The test is based on the recommendations of the American Phytopathological Committee (1943). On a glass slide a deposit of known weight of the compound under test is formed by allowing an acetone solution of known concentration of the compound to evaporate. Spores of one of a number of pathogenic fungi in aqueous suspensions are set on these deposits to germinate and the percentage germination is noted. In Table I the results of these tests are shown, the "approximate L.D. 50" being the concentration in parts per million of the acetone solution of the substance under test which is calculated would inhibit 50% of the spores from germinating; the higher the value of the L.D. 50 the lower the activity of the compound. The figures shown in the column headed "Derived L.D. 50" are obtained by suspending spores in a series of solutions of graded dilutions of the substance under test and assessing the concentration causing 50% inhibition of germination. The test solutions are prepared by dilution with water of a 5% w./v. solution of the substance in acetone. In Table I the symbols *B.c.*, *S.f.*, *C.f.*, and *V.i.* represent the fungi *Botrytis cinerea*, *Sclerotinia fructigena*, *Cladosporium fulvum* and *Venturia inaequalis* respectively.

*Table I*

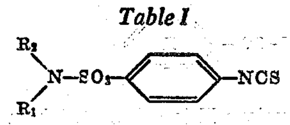

| $R_1$ | $R_2$ | Approximate L.D. 50 | | | | Derived L.D. 50 *V.i.* |
|---|---|---|---|---|---|---|
| | | *B.c.* | *S.f.* | *C.f.* | *V.i.* | |
| H | Methyl | 12 | 3 | 6 | 4 | |
| H | Cyclohexyl | 2 | 2 | 3 | 8 | |
| H | Ethyl | 12 | 12 | 50 | 1.5 | |
| H | isoPropyl | 12 | 12 | 6 | <2 | 1.4 |
| H | n-Butyl | 1.5 | <1 | <1 | <1 | 0.56 |
| H | n-Propyl | 1.5 | 2 | 1.5 | <1 | 0.92 |
| H | Benzyl | 3 | <2 | 3 | 1.5 | |
| H | Phenyl | 3 | <2 | 1.5 | <1 | 0.63 |
| H | isoButyl | 16 | 1.5 | 1.5 | 1.5 | |
| H | p-Chlorobenzyl | 3 | 1.5 | 1.5 | 2 | |
| H | n-Pentyl | <1 | <1 | <1 | <1 | 0.75 |
| H | p-Tolyl | 3 | <1 | <1 | <1 | 0.24 |
| H | p-Methoxyphenyl | 3 | <1 | 1.5 | <1 | 0.27 |
| H | o-Tolyl | 8 | 1.5 | 1.5 | 2 | |
| H | m-Chlorophenyl | 3 | <1 | 1.5 | <1 | 0.26 |
| H | p-Ethoxyphenyl | 3 | <1 | <1 | <1 | 0.49 |
| H | n-Heptyl | >400 | >400 | 2 | 80 | |
| H | n-Hexyl | >400 | >400 | 200 | 2 | 1.1 |
| H | Allyl | 8 | <1 | 1.5 | <1 | 0.41 |
| H | 3-Methylbutyl | 3 | 1.5 | 12 | <1 | 0.18 |
| H | secButyl | 6 | 4 | 1.5 | 1.5 | |
| H | 4-Methylpentyl | 4 | 1.5 | 1.5 | 2 | 1.8 |
| H | m-Nitrophenyl | 8 | 1.5 | 12 | 2 | |
| H | o-Methoxyphenyl | 12 | 3 | 1.5 | <1 | 0.73 |
| H | o-Chlorophenyl | 6 | 1.5 | 12 | <1 | 0.69 |
| Methyl | Methyl | 3 | 3 | 12 | <1 | 0.62 |
| Ethyl | Ethyl | 3 | 1.5 | 1.5 | <1 | 0.74 |
| n-Butyl | n-Butyl | >400 | >400 | <1 | 8 | |
| isoButyl | isoButyl | >400 | >400 | 6 | >400 | |
| n-Propyl | n-Propyl | 6 | 6 | <1 | 2 | |
| Methyl | Phenyl | <2 | <2 | <2 | <1 | 0.8 |
| n-Butyl | do | 200 | >400 | <2 | 3 | |
| n-Propyl | do | >400 | >400 | 200 | 6 | |
| Methyl | Benzyl | >400 | 6 | 1.5 | 6 | |
| Ethyl | Phenyl | >400 | 6 | 50 | 1.5 | |
| 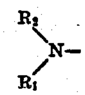  | | | | | | |
| Piperidyl | | 8 | 6 | <2 | <1 | 0.34 |
| Morpholyl | | 50 | 12 | <2 | 50 | |
| Pyrrolidyl | | 6 | 1.5 | 2 | 1 | 0.47 |
| 3-Methylpiperidyl | | 6 | >400 | >400 | 1.5 | |
| 2-Methylpiperidyl | | 4 | 3 | 1.5 | <1 | 0.97 |
| 4-Methylpiperidyl | | 50 | 1.5 | <2 | <2 | |
| $\Delta^3$-Tetrahydropyridyl | | 1.5 | <2 | 1.5 | <1 | 0.41 |

(2) *Bunt of wheat test.*—A number of the compounds of the invention have been tested in the following manner. Seeds of wheat are infected with *Tilletia caries* and dressed with dusts containing 10% w./w. of the substance under test in kaolin at the rate of 2 ozs. of dust per bushel of seed. The dressed seeds are incubated for 5 days on agar and at the end of this time the seeds are removed from the agar and the spores of the fungus remaining on the agar surface are examined for germination. The results obtained in this test with a number of the compounds of the invention are shown in Table II.

(3) *Impregnation test.*—In this test agar plates are prepared in which the agar contains the substance under test at a concentration of 10 parts per million the substance being introduced into the hot agar from an acetone solution before the plate is poured. The centre of each plate is inoculated with *Botrytis cinerea* and the plates are incubated; the size of the colony is measured diametrically at 3 day intervals and is compared with untreated controls. The results obtained in this test with a number of the compounds of the invention are shown in Table II.

(4) *Damping-off fungi trials.*—In this test cubes of agar containing mycelium of either *Pythium debaryanum* or *Corticium solani* are coated with dusts containing 0.5% w./w. of the substance under test in kaolin and placed in the centre of agar plates. A measure of the activity of the compounds under test is obtained by observation of the diameter of the colonies at intervals. Results obtained in this test with a number of the compounds of the invention are shown in Table II.

plants is sprayed to run off with an aqueous suspension containing 0.05% w./v. of the compound under test. When the spray deposit is dry the plants are enclosed in a chamber in a moist atmosphere at a temperature of 75° F. and the plants are inoculated with spores of *Cladosporium fulvum*. A group of untreated plants is inoculated in a similar manner. The plants are kept under these conditions for 3 days and are then kept under normal glasshouse conditions for 15–18 days. At the end of this time three leaves are removed from each plant and examined; the number of lesions per leaf is counted. The average number of lesions per leaf in the treated plants is expressed as a percentage of the average number of lesions per leaf in the untreated control plants and this figure is designated "percentage infection."

Substances which show activity in the above spray test are submitted to a further test which employs the active substance in the form of an aerosol. A group of five young tomato plants is placed in a fumigation chamber of a volume of 11 cu. ft. and 0.125 cc. of a 5% w./v. solution of the substance under test in acetone is dispersed into the chamber by means of a paint spray gun. The aerosol cloud is allowed to settle for 3 hours after which the plants are removed from the fumigation chamber, inoculated with spores of *Cladosporium fulvum* and the infection assessed as described above in the spray test. The results obtained in the above tests are summarised in Table III.

(2) *Groundsel mildew.*—In this test groups of 5 groundsel plants growing in pots in a glasshouse are sprayed to

Table II

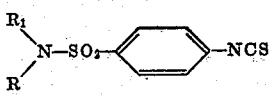

| R₁ | R₂ | Bunt of Wheat | Impregnation Test | Damping Off Test | |
|---|---|---|---|---|---|
| | | | | *Pythium debaryanum* | *Corticium solani* |
| H | Methyl | P | | C | |
| H | Ethyl | | | C | C |
| H | isoPropyl | C | | | |
| H | n-Butyl | C | | | |
| H | Benzyl | C+ | | | |
| H | Phenyl | C+ | | | |
| H | isoButyl | C+ | | | |
| H | p-Chlorophenyl | C+ | | | |
| H | n-Pentyl | C+ | | | |
| H | p-Tolyl | C+ | | | |
| H | m-Chlorophenyl | C | | | |
| H | n-Heptyl | C+ | | | |
| Methyl | Phenyl | | | | P |
| Do | Methyl | | | P | |
| Ethyl | Ethyl | | | | C |
| isoButyl | isoButyl | C+ | | | |
| Methyl | Benzyl | P | | | |
| Ethyl | Phenyl | C+ | | | |

| R₁\N—\R₂ | | | | | |
|---|---|---|---|---|---|
| Morpholyl | | C+ | | | P |
| Pyrrolidyl | | | | | |
| Δ³ Tetrahydropyridyl | | P | | | |

Key: C=complete control. C+=95% control. P=50% or more control.

EXTENSION TESTS

A number of compounds have been subjected to further tests which are designed to ascertain the activities of the compounds against various fungi living on a plant host.

(1) *Tomato leaf mould* (Cladosporium fulvum).—This test is carried out using young tomato plants growing in pots in a glasshouse. A group consisting of five tomato run off with an aqueous suspension containing 0.05% w./v. of the compound under test and as soon as the spray deposit is dry the plants are artificially infected with *Oidium sp.* under similar conditions to those described for the tomato leaf mould test. The degree of control of the mildew by the treatment is assessed by a visual examination of the plants and the results are expressed in Table III on an arbitrary scale of very good control (VG), good control (G), fair control (F), and poor control (P).

(3) *Apple mildew* (Podosphaera leucotricha).—This test is carried out in a similar manner to that described above for groundsel mildew employing apple seedlings growing in pots in a glasshouse. The results are expressed in Table III in like manner to those obtained in the Groundsel mildew test.

(4) *Apple scab* (Venturia inaequalis).—The activity of a number of the compounds of the invention has been assessed by small scale field trials. Two trials have been carried out as follows:

Site A: In this trial the trees were two year old Bramleys planted close together in a nursery and randomised blocks each containing four trees were used for each substance under test. The trees were sprayed to run off six times between April and July 1956, with aqueous suspensions containing 0.1% w./v. of active ingredient. An assessment of the effectiveness of the compounds under test was made in the middle of August by collecting 100 leaves from each tree and measuring the percentage area of each infected by the fungus. The results quoted in Table III are averages of the percentage areas infected on the 400 leaves collected from each block of trees. For the purposes of comparison control blocks of trees which received no treatment were similarly examined, the average degree of infection in the controls being 1.2%.

Site B: In this trial 8–10 year old Lord Lambourne trees were used and each substance under test was applied to four trees. The trial was carried out in exactly the same manner as that conducted in Site A. The results obtained are summarised in Table III. The average degree of infection on the leaves of control trees was 1.58%.

(5) *Celery leaf spot.*—The activity of some of the compounds of the invention against Septoria apii-graveolentis on celery plants was determined in a similar manner to that described for the first of the two tomato leaf mould tests. The results are summarised in Table III and expressed in the same manner as those obtained in the tomato leaf mould tests.

layer is permanently neutral. The chloroform layer is separated, dried over anhydrous sodium sulphate and evaporated to dryness. The residue is recrystallised from 60 cc. of a mixture of equal volumes of trichloroethylene and petroleum ether (boiling range 60–80° C.). There is thus obtained N:N-dimethyl-p-isothiocyanatobenzenesulphonamide in the form of a crystalline solid which has a melting point of 96–97° C. (Found: C, 44.2; H, 4.3. $C_9H_{10}O_2N_2S_2$ requires C, 44.6; H, 4.1%.)

In exactly similar manner using the appropriate $N^1$-substituted sulphanilamide, there are prepared the following compounds.

N - methyl - p - isothiocyanatobenzenesulphonamide. M.P. 137–139° C. (Found: C, 42.3; H, 3.6. $C_8H_8O_2N_2S_2$ requires C, 42.1; H, 3.5%.)

N - cyclohexyl - p - isothiocyanatobenzenesulphonamide. M.P. 141–143° C. (Found: C, 52.9; H, 5.5. $C_{13}H_{16}O_2N_2S_2$ requires C, 52.7; H, 5.4%.)

N - ethyl - p - isothiocyanatobenzenesulphonamide. M.P. 122–124° C. (Found: C, 45.0; H, 4.2. $C_9H_{10}O_2N_2S_2$ requires C, 44.6; H, 4.1%.)

N - isopropyl - p - isothiocyanatobenzenesulphonamide. M.P. 108–111° C. (Found: C, 46.6; H, 4.8. $C_{10}H_{12}O_2N_2S_2$ requires C, 46.9; H, 4.7%.)

N:N - diethyl - p - isothiocyanatobenzenesulphonamide. M.P. 68–70° C. (Found: C, 49.3; H, 5.0. $C_{11}H_{14}O_2N_2S_2$ requires C, 48.9; H, 5.2%.)

N - n - butyl - p - isothiocyanatobenzenesulphonamide. M.P. 119–123° C. (Found: C, 48.8; H, 5.3. $C_{11}H_{14}O_2N_2S_2$ requires C, 48.9; H, 5.2%.)

N - n - propyl - p - isothiocyanatobenzenesulphonamide. M.P. 119–121° C. (Found: C, 46.9; H, 4.7. $C_{10}H_{12}O_2N_2S_2$ requires C, 46.9; H, 4.7%.)

N - benzyl - p - isothiocyanatobenzenesulphonamide. M.P. 128–131° C. (Found: C, 55.0; H, 4.0. $C_{14}H_{12}O_2N_2S_2$ requires C, 55.3; H, 4.0%.)

N - phenyl - p - isothiocyanatobenzenesulphonamide. M.P. 121–124° C. (Found: C, 53.9; H, 3.5. $C_{13}H_{10}O_2N_2S_2$ requires C, 53.8; H, 3.5%.)

N - isobutyl - p - isothiocyanatobenzenesulphonamide. M.P. 136–141° C. (Found: C, 49.3; H, 5.3. $C_{11}H_{14}O_2N_2S_2$ requires C, 48.9; H, 5.2%.)

N:N - di - n - butyl - p - isothiocyanatobenzenesulphonamide. M.P. 51.5–52.5° C. (Found: C, 54.9; H, 6.8. $C_{15}H_{22}O_2N_2S_2$ requires C, 55.2; H, 6.8%.)

N - (p - chlorophenyl) - p - isothiocyanatobenzenesulphonamide. M.P. 123–126° C. (Found: C, 48.0; H, 3.0. $C_{13}H_9O_2N_2ClS_2$ requires C, 48.1; H, 2.8%.)

N:N - di - isobutyl - p - isothiocyanatobenzenesulphonamide. M.P. 134–137° C. (Found: C, 54.9; H, 6.8. $C_{15}H_{22}O_2N_2S_2$ requires C, 55.2; H, 6.8%.)

Table III $$\underset{R_2}{\overset{R_1}{\diagdown}}N-SO_2-\!\!\left\langle\!\!\!\bigcirc\!\!\!\right\rangle\!\!-NCS$$

| $R_1$ | $R_2$ | Tomato Leaf Mould (percent infection) | | Groundsel Mildew | Apple Mildew | Apple Scab | | Celery Leaf Spot (percent infection) |
|---|---|---|---|---|---|---|---|---|
| | | Spray | Aerosol | | | Percent infection | Site | |
| H | n-Butyl | 20 | 44 | P | | 0.11 | B | 4.7 |
| H | n-Propyl | 5 | 42 | G | | 0.09 | B | 6.3 |
| H | n-Pentyl | 4 | 12 | G | G | 1.25 | B | |
| H | p-Tolyl | 1 | | F | | 0.69 | A | 13.0 |

| $R_1$ $\diagdown$ N— $R_2$ $\diagup$ | | | | | | | | |
|---|---|---|---|---|---|---|---|---|
| Piperidyl | | 4 | 14 | VG | G | 0.73 | A | 5.5 |

The following non-limitative examples illustrate the invention.

EXAMPLE 1

In the preparation of N:N-dimethyl-p-isothiocyanatobenzenesulphonamide a solution of 5:5 cc. of thiophosgene in 50 cc. of chloroform is added to a suspension of 9.8 grams of $N^1$:$N^1$-dimethylsulphanilamide in 25 cc. of 2 N hydrochloric acid with stirring. Potassium carbonate is added to the stirred mixture until the aqueous N:N - di - n - propyl - p - isothiocyanatobenzenesulphonamide. M.P. 48–51° C. (Found: C, 52.3; H, 6.1. $C_{13}H_{18}O_2N_2S_2$ requires C, 52.3; H, 6.0%.)

N - octyl - p - isothiocyanatobenzenesulphonamide. M.P. 109–112° C. (Found: C, 55.3; H, 6.8. $C_{15}H_{22}O_2N_2S_2$ requires C, 55.2; H, 6.75%.)

N - n - hexyl - p - isothiocyanatobenzenesulphonamide. M.P. 114–115° C. (Found: C, 52.5; H, 6.1. $C_{13}H_{18}O_2N_2S_2$ requires C, 52.4; H, 6.0%).

N - n - heptyl - p - isothiocyanatobenzenesulphonamide. M.P. 110–112° C. (Found: C, 53.5; H, 6.6. $C_{14}H_{20}O_2N_2S_2$ requires C, 53.8; H, 6.4%.)

N - (3 - methylbutyl) - p - isothiocyanatobenzenesulphonamide. M.P. 135–136° C. (Found: C, 50.6; H, 5.5. $C_{12}H_{16}O_2N_2S_2$ requires C, 50.7; H, 5.6%.)

N - sec - butyl - p - isothiocyanatobenzenesulphonamide. M.P. 100–102° C. (Found: C, 48.64; H, 5.5. $C_{11}H_{14}O_2N_2S_2$ requires C, 49.0; H, 5.2%.)

N - (4 - methylpentyl) - p - isothiocyanatobenzenesulphonamide. M.P. 92–94° C. (Found: C, 52.0, H, 6.1. $C_{13}H_{18}O_2N_2S_2$ requires C, 52.3, H, 6.0%.)

N - n - dodecyl - p - isothiocyanatobenzenesulphonamide. M.P. 110° C. (Found: C, 60.0; H, 8.0. $C_{19}H_{30}O_2N_2S_2$ requires C, 59.7; H, 7.8%.)

N - allyl - p - isothiocyanatobenzenesulphonamide. M.P. 100–101° C. (Found: C, 47.5; H, 3.8. $C_{10}H_{10}O_2N_2S_2$ requires C, 47.2; H, 3.9%.)

N:N - di - n - pentyl - p - isothiocyanatobenzenesulphonamide. M.P. 35–37° C. (Found: C, 58.1; H, 7.4. $C_{17}H_{26}O_2N_2S_2$ requires C, 57.6; H, 7.35%.)

N - o - chlorophenyl - p - isothiocyanatobenzenesulphonamide. M.P. 153–156° C. (Found: C, 47.8; H, 2.9. $C_{13}H_9O_2N_2ClS_2$ requires C, 48.1; H, 2.8%.)

N - m - chlorophenyl - p - isothiocyanatobenzenesulphonamide. M.P. 115–117° C. (Found: C, 48.1; H, 2.8. $C_{13}H_9O_2N_2ClS_2$ requires C, 47.9; H, 2.8%.)

N - p - methoxyphenyl - p - isothiocyanatobenzenesulphonamide. M.P. 125–126° C. (Found: C, 52.6; H, 3.9. $C_{14}H_{12}O_3N_2S_2$ requires C, 52.5; H, 3.75%.)

N - o - methoxyphenyl - p - isothiocyanatobenzenesulphonamide. M.P. 119–121° C. (Found: C, 52.2; H, 3.9. $C_{14}H_{12}O_3N_2S_2$ requires C, 52.5; H, 3.75%.)

N - p - ethoxyphenyl - p - isothiocyanatobenzenesulphonamide. M.P. 135–137° C. (Found: C, 54.2; H, 4.1. $C_{15}H_{14}O_3N_2S_2$ requires C, 53.9; H, 4.2%.)

N - m - nitrophenyl - p - isothiocyanatobenzenesulphonamide. M.P. 137–139° C. (Found: C, 46.5; H, 2.8. $C_{13}H_9O_4N_3S_2$ requires C, 46.5; H, 2.7%.)

N - methyl - N - phenyl - p - isothiocyanatobenzenesulphonamide. M.P. 112–117° C. (Found: C, 55.7; H, 4.0. $C_{14}H_{12}O_2N_2S_2$ requires C, 55.3; H, 3.95%.)

N - n - propyl - N - phenyl - p - isothiocyanatobenzenesulphonamide. M.P. 128–129° C. (Found: C, 57.6; H, 4.9. $C_{16}H_{16}O_2N_2S_2$ requires C, 57.7; H, 4.8%.)

N - n - butyl - N - phenyl - p - isothiocyanatobenzenesulphonamide. M.P. 97–98° C. (Found: C, 59.3; H, 5.4. $C_{17}H_{18}O_2N_2S_2$ requires C, 58.9; H, 5.2%.)

N - ethyl - N - phenyl - p - isothiocyanatobenzenesulphonamide. M.P. 110° C. (Found: C, 56.85; H, 4.5. $C_{15}H_{14}O_2N_2S_2$ requires C, 56.6; H, 4.4%.)

N-benzyl-N-methyl - p - isothiocyanatobenzenesulphonamide, M.P. 123–124° C. (Found: C, 56.3; H, 4.6. $C_{15}H_{14}O_2N_2S_2$ requires C, 56.6; H, 4.4%.)

N - ethyl-m-isothiocyanatobenzenesulphonamide, M.P. 77° C. (Found: C, 44.8; H, 4.3. $C_9H_{10}O_2N_2S_2$ requires C, 44.7; H, 4.1%.)

$N^1$-isobutylsulphanilamide which is employed in the preparation of N-isobutyl - p - isothiocyanatobenzenesulphonamide is prepared in the following manner. A mixture of 20 grams of N-isobutyl-p-acetamidobenzenesulphonamide and 100 cc. of 6 N hydrochloric acid is heated under reflux for 10 minutes. The clear solution so obtained is neutralised by the addition of sodium hydroxide solution and the precipitate so produced is recrystallised from ethyl acetate. There is thus obtained $N^1$-isobutyl- sulphanilamide in the form of a crystalline solid which has a melting point of 125.5–128.5° C. (Found: C, 52.5; H, 7.1. $C_{10}H_{16}O_2N_2S$ requires C, 52.6; H, 7.0%.)

$N^1$:$N^1$-di-isobutylsulphanilamide which is employed in the preparation of N:N-di-isobutyl-p-isothiocyanatobenzenesulphonamide is prepared in the following manner.

52 grams of di-isobutylamine are added to a suspension of 111 grams of moist p-acetamidobenzenesulphonyl chloride estimated to contain 42% w./w. of pure material in 400 cc. of water. The mixture so obtained is allowed to stand with occasional shaking for 48 hours and during this time it is kept neutral by the addition of 20% w./v. potassium carbonate solution as required. After 48 hours the solid produced is removed by filtration and recrystallised from ethyl acetate to give N:N-di-isobutyl-p-acetamidobenzenesulphonamide in the form of a crystalline solid which has a melting point of 137–138° C. (Found: C, 59.1; H, 8.0. $C_{16}H_{26}O_3N_2S$ requires C, 58.9; H, 8.0%.) This material is hydrolysed in exactly similar manner to that described above for the hydrolysis of $N^1$-isobutyl-p-acetamidobenzenesulphonamide. There is thus obtained $N^1$:$N^1$-di-isobutylsulphanilamide in the form of a crystalline solid which has a melting point of 147–150° C. (Found: C, 59.3; H, 8.6. $C_{14}H_{24}O_2N_2S$ requires C, 59.2; H, 8.5%.)

In exactly similar manner using di-n-propylamine in place of di-isobutylamine, there is obtained $N^1$:$N^1$-di-n-propylsulphanilamide in the form of a crystalline solid which has a melting point of 121–124° C. and which is employed in the preparation of N:N-di-n-propyl-p-isothiocyanatobenzenesulphonamide. (Found: C, 56.4; H, 7.95. $C_{12}H_{20}O_2N_2S$ requires C, 56.2; H, 7.8%.)

In exactly similar manner using the appropriate amine there are obtained the following compounds which are employed as intermediates in the preparation of compounds described above.

$N^1$-n-hexylsulphanilamide, M.P. 126–129° C. (Found: C, 55.9; H, 7.8. $C_{12}H_{20}O_2N_2S$ requires C, 56.25; H, 7.8%.)

$N^1$-n-heptylsulphanilamide, M.P. 119–121° C. (Found: C, 57.9; H, 8.3. $C_{13}H_{22}O_2N_2S$ requires C, 57.8; H, 8.15%.)

$N^1$-(3-methylbutyl)sulphanilamide, M.P. 125–127° C. (Found: C, 54.3; H, 7.4. $C_{11}H_{18}O_2N_2S$ requires C, 54.5; H, 7.45%.)

$N^1$ - sec - butylsulphanilamide, M.P. 132–135° C. (Found: C, 52.2; H, 7.0. $C_{10}H_{16}O_2N_2S$ requires C, 52.6; H, 7.0%.)

$N^1$-(4-methylpentyl)sulphanilamide, M.P. 140–142° C. (Found: C, 55.9; H, 7.8. $C_{12}H_{20}O_2N_2S$ requires C, 56.25; H, 7.8%.)

$N^1$:$N^1$-(di-n-pentyl)sulphanilamide, M.P. 55–58° C.

$N^1$-(o-chlorophenyl)sulphanilamide, M.P. 169–172° C. (Found: C, 50.7; H, 3.8. $C_{12}H_{11}O_2N_2ClS$ requires C, 51.0; H, 3.9%.)

$N^1$-(m-chlorophenyl)sulphanilamide, M.P. 132–135° C. (Found: C, 51.3; H, 4.0. $C_{12}H_{11}O_2N_2ClS$ requires C, 51.0; H, 3.9%.)

$N^1$-(o-methoxyphenyl)sulphanilamide, M.P. 197–201° C. (Found: C, 55.75; H, 5.3. $C_{13}H_{14}O_3N_2S$ requires C, 56.1; H, 5.0%.)

$N^1$-phenyl-$N^1$-n-propylsulphanilamide, M.P. 105–107° C. (Found: C, 62.2; H, 6.2. $C_{15}H_{18}O_2N_2S$ requires C, 62.1; H, 6.2%.)

$N^1$-n-butyl-$N^1$-phenylsulphanilamide, M.P. 68–70° C. (Found: C, 62.9; H, 6.5. $C_{16}H_{20}O_2N_2S$ requires C, 63.2; H, 6.6%.)

$N^1$ - ethyl - $N^1$ - phenylsulphanilamide, M.P. 135° C. (Found: C, 60.5; H, 6.0. $C_{14}H_{16}O_2N_2S$ requires C, 60.9; H, 5.8%.)

$N^1$-benzyl-$N^1$-methylsulphanilamide, M.P. 131–134° C. (Found: C, 60.7; H, 5.8. $C_{14}H_{16}O_2N_2S$ requires C, 60.9; H, 5.8%.)

EXAMPLE 2

In the preparation of N-n-pentyl-p-isothiocyanatobenzenesulphonamide, a solution of 3 cc. of thiophosgene in 20 cc. of chloroform is added to a suspension of 8 grams of $N^1$-n-pentylsulphanilamide in 16 cc. of 2 N hydrochloric acid with stirring. Potassium carbonate is added to the stirred mixture until the aqueous layer is permanently neutral. The chloroform layer is separated, dried over anhydrous sodium sulphate and evaporated to dryness. The residue is recrystallised from petroleum ether (boiling range 100–120° C.). There is thus obtained N-n-pentyl-p-isothiocyanatobenzenesulphonamide in the form of a crystalline solid which has a melting point of 113–115° C. (Found: C, 50.9; H, 5.9. $C_{12}H_{16}O_2N_2S_2$ requires C, 50.7; H, 5.6%.)

$N^1$-n-pentylsulphanilamide employed in the above preparation is prepared in the following manner. 18 grams of n-pentylamine are added to a suspension of 55 grams of moist p-acetamidobenzenesulphonyl chloride estimated to contain 42% w./w. of pure material in 200 cc. of water. The mixture so obtained is allowed to stand with occasional shaking for 48 hours and during this time it is kept neutral by the addition of 20% w./v. potassium carbonate solution as required. After 48 hours the solid produced is removed by filtration and recrystallised from ethyl acetate to give $N^1$-n-pentyl-p-acetamidobenzenesulphonamide in the form of a crystalline solid which has a melting point of 117–121° C. (Found: C, 54.7; H, 7.2. $C_{13}H_{20}O_3N_2S$ requires C, 54.9; H, 7.1%.) This material is heated under reflux for 10 minutes with 100 cc. of 6 N hydrochloric acid. The clear solution so obtained is neutralised by the addition of sodium hydroxide solution and the precipitate so produced is recrystallised from alcohol. There is thus obtained $N^1$-n-pentylsulphanilamide in the form of a crystalline solid which has a melting point of 124–127° C. (Found: C, 54.6; H, 7.2. $C_{11}H_{18}O_2N_2S$ requires C, 54.5; H, 7.45%.)

EXAMPLE 3

(a) In the preparation of p-isothiocyanatobenzenesulphonpiperidide a solution of 17 cc. of thiophosgene in 100 cc. of chloroform is added to a suspension of 48 grams of sulphanilpiperidide in 100 cc. of 2 N hydrochloric acid with stirring. Sodium bicarbonate is added to the stirred mixture until the aqueous layer is permanently neutral. The chloroform layer is separated, dried over anhydrous sodium sulphate and evaporated to dryness. The residue is recrystallised from a mixture of equal volumes of trichloroethylene and petroleum ether (boiling range 60–80° C.). There is thus obtained p-isothiocyanatobenzenesulphonpiperidide in the form of a colourless crystalline solid which has a melting point of 125–128° C. (Found: C, 51.1; H, 4.9.

$C_{12}H_{14}O_2N_2S_2$ requires C, 51.1; H, 5.0%.)

In exactly similar manner using sulphanilpyrrolidide and sulphanilmorpholide respectively in place of sulphanilpiperidide, there are prepared the following compounds:

p-isoThiocyanatobenzenesulphonpyrrolidide, M.P. 117–118° C. (Found: C, 49.4; H, 4.5. $C_{11}H_{12}O_2N_2S_2$ requires C, 49.3; H, 4.5%.)

p-isoThiocyanatobenzenesulphonmorpholide, M.P. 113–114° C. (Found: C, 46.5, H, 4.3. $C_{11}H_{12}O_3N_2S$ requires C, 46.5, H, 4.2%.)

p-isoThiocyanatobenzenesulphon - 3 - methylpiperidide M.P. 105–107° C. (Found: C, 52.45, H, 5.65.

requires C, 52.7; H, 5.4%.)

p-isoThiocyanatobenzenesulphon - 2 - methylpiperidide, M.P. 86–88° C. (Found: C, 52.9; H, 5.5.

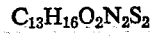

requires C, 52.7; H, 5.4%.)

p-isoThiocyanatobenzenesulphon - $\Delta^3$ - tetrahydropyridide, M.P. 98–101° C. (Found: C, 51.5; H, 4.5.

requires C, 51.4; H, 4.3%.)

p-isoThiocyanatobenzenesulphon - 4 - methylpiperidide, M.P. 108–111° C. (Found: C, 52.7; H, 5.7.

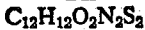

requires C, 52.7; H, 5.4%.)

Sulphanil-3-methylpiperidide which is used as starting material in the preparation of p-isothiocyanatobenzenesulphon-3-methylpiperidide is prepared in the following manner. A mixture of 59 grams of p-acetamidobenzenesulphonyl chloride and 31 grams of 3-methylpiperidine in a small volume of water is shaken from time to time and kept alkaline with sodium carbonate. After 4 days the solid which separates is isolated and recrystallised from methanol to give p-acetamidobenzenesulphon-3-methylpiperidide methanolate, M.P. 78–82° C. (Found: C, 54.8; H, 7.4. $C_{14}H_{20}O_3N_2S$ requires C, 54.9; H, 7.3%.) This material is hydrolysed by boiling for ten minutes with an excess of 6 N hydrochloric acid. The clear solution so obtained is neutralised by the addition of sodium hydroxide solution and the solid which separates is recrystallised from methanol. There is thus obtained sulphanil-3-methylpiperidide in the form of a crystalline solid which has a melting point of 125–130° C. (Found: C, 56.5; H, 7.3. $C_{12}H_{18}O_2N_2S$ requires C, 56.7; H, 7.1%.)

In exactly similar manner using 2-methylpiperidine, 4-methylpiperidine and $\Delta^3$-tetrahydropyridine respectively in place of 3-methylpiperidine the following compounds are prepared.

Sulphanil - 2 - methylpiperidide, M.P. 109–117° C. (Found: C, 56.45; H, 7.2. $C_{12}H_{18}O_2N_2S$ requires C, 56.7; H, 7.1%.)

Sulphanil - 4 - methylpiperidide, M.P. 110–112° C. (Found: C, 56.75; H, 7.0. $C_{12}H_{18}O_2N_2S$ requires C, 56.7; H, 7.1%.)

Sulphanil-$\Delta^3$-tetrahydropyridide, M.P. 172–175° C. (Found: C, 55.2; H, 6.0. $C_{11}H_{14}O_2N_2S$ requires C, 55.5; H, 5.9%.)

(b) In the preparation of p-isothiocyanatobenzenesulphonpiperidide 62.5 cc. of redistilled trichloromethanesulphenyl chloride is slowly added to a stirred mixture of 120 grams of sulphanilpiperidide, 500 cc. of alcohol-free chloroform, 169 grams of stannous chloride, 525 cc. of 2 N hydrochloric acid and 225 cc. of water. The reaction mixture is stirred for 2.5 hours, filtered through kieselguhr and separated into a chloroform layer and an aqueous layer. The aqueous layer is extracted with chloroform (2×50 cc.) and these extracts are combined with the main chloroform layer. The combined solution is dried over anhydrous sodium sulphate and the chloroform removed by distillation under reduced pressure. The residue is washed with 125 cc. of petroleum ether (boiling range 60–80° C.) and recrystallised from trichloroethylene. There is thus obtained p-isothiocyanatobenzenesulphonpiperidide in the form of a crystalline solid which is identical with the product described in (a) above.

In exactly similar manner using $N^1$-methyl-$N^1$-phenylsulphanilamide in place of sulphanilpiperidide there is obtained N-methyl-N-phenyl-p-isothiocyanatobenzenesulphonamide which is identical with the compound listed as prepared by the method described in Example 1.

EXAMPLE 4

In the preparation of p-isothiocyanato-N-(p-tolyl)-benzenesulphonamide a solution of 33 cc. of thiophosgene in 300 cc. of chloroform is added to a suspension of 93 grams of $N^1$-(p-tolyl)sulphanilamide in 360 cc. of N hydrochloric acid with stirring. Sodium bicarbonate is added to the stirred mixture until the aqueous layer is permanently neutral. The chloroform layer is separated, dried over anhydrous sodium sulphate and evaporated to dryness. The residue is recrystallised from petroleum ether (boiling range 100–120° C.) and again from trichloroethylene. There is thus obtained p-isothiocyanato-N-(p-tolyl)benzenesulphonamide in the form of a crystalline solid which has a melting point of 111–113° C. (Found: C, 54.9; H, 4.3. $C_{14}H_{12}O_2N_2S_2$ requires C, 55.3; H, 4.0%.)

In exactly similar manner using $N^1$-(o-tolyl)-sulphanilamide in place of $N^1$-(p-tolyl)sulphanilamide there is obtained p-isothiocyanato-N-(o-tolyl)benzenesulphonamide in the form of a crystalline solid which has a melting point of 163–166° C. (Found: C, 55.3; H, 4.2. $C_{14}H_{12}O_2N_2S_2$ requires C, 55.3; H, 4.0%.)

EXAMPLE 5

In the preparation of a dispersible powder, 20 parts by weight of N-n-butyl-p-isothiocyanatobenzenesulphonamide is intimately mixed with 8 parts by weight of Belloid T.D. (a condensate of formaldehyde and an alkyl aryl sulphonate) and 72 parts by weight of kaolin. This composition may be added to water to form a dispersion suitable for horticultural use.

EXAMPLE 6

In the preparation of a fungicidal dust, 5 parts by weight of N-n-butyl-p-isothiocyanatobenzenesulphonamide is intimately mixed with 95 parts by weight of kaolin.

Compositions similar to those described in Examples 5 and 6 may be prepared in which the active ingredient specifically mentioned is replaced by any of the compounds listed in Examples 1, 2, 3 and 4.

EXAMPLE 7

In the preparation of a composition suitable for dispersion as an aerosol sufficient N-ethyl-p-isothiocyanatobenzenesulphonamide is dissolved in a mixture of 5 parts by volume of arachis oil and 95 parts by volume of substantially anhydrous acetone to obtain a composition which contains 5% w./v. of active ingredient.

This composition is readily dispersed as an aerosol by mechanical means, for example, by the use of a paint spray gun.

Similar compositions may be prepared in which the active ingredient is one of the following compounds.

N-n-butyl-p-isothiocyanatobenzenesulphonamide.
N-n-propyl-p-isothiocyanatobenzenesulphonamide
N-phenyl-p-isothiocyanatobenzenesulphonamide
N-isobutyl-p-isothiocyanatobenzenesulphonamide
N-n-pentyl-p-isothiocyanatobenzenesulphonamide
N-p-ethoxyphenyl-p-isothiocyanatobenzenesulphonamide
N-n-hexyl-p-isothiocyanatobenzenesulphonamide
N:N-di-n-propyl-p-isothiocyanatobenzenesulphonamide
N-methyl-N-phenyl-p-isothiocyanatobenzenesulphonamide
p-isoThiocyanatobenzenesulphonpiperidide
p-isoThiocyanatobenzenesulphonpyrrolidide

EXAMPLE 8

In the preparation of a composition suitable for dispersion as an aerosol, sufficient N-isopropyl-p-isothiocyanatobenzenesulphonamide is dissolved in substantially anhydrous acetone to obtain a solution which contains 5% w./v. of active ingredient.

This composition is readily dispersed as an aerosol by mechanical means, for example, by the use of a paint spray gun.

Compositions similar to that described in Example 8 may be prepared in which the active ingredient specifically mentioned is replaced by any of the compounds listed in Examples 1, 2, 3 and 4.

EXAMPLE 9

In the preparation of a dispersible powder 10 parts by weight of N-n-propyl-p-isothiocyanatobenzenesulphonamide is intimately mixed with 8 parts by weight of Belloid T.D. (a condensate of formaldehyde and an alkyl aryl sulphonate) and 82 parts by weight of kaolin. This composition may be added to water to form a dispersion suitable for horticultural use.

In exactly similar manner compositions may be prepared which contain one of the following compounds as active ingredient.

N-n-butyl-p-isothiocyanatobenzenesulphonamide
N-n-pentyl-p-isothiocyanatobenzenesulphonamide
p-isoThiocyanatobenzenesulphonpiperidide
N-phenyl-p-isothiocyanatobenzenesulphonamide

EXAMPLE 10

In the preparation of a dispersible powder 10 parts by weight of N-p-tolyl-p-isothiocyanatobenzenesulphonamide is intimately mixed with 8 parts by weight of Belloid T.D. (a condensate of formaldehyde and an alkyl aryl sulphonate), 5 parts by weight of Nansa S (the sodium salt of an alkylarylsulphonic acid) and 77 parts by weight of kaolin. This composition may be added to water to form a dispersion suitable for horticultural use.

In exactly similar manner a composition may be prepared which contains N-methyl-N-phenyl-p-isothiocyanatobenzenesulphonamide as active ingredient.

EXAMPLE 11

In the preparation of a composition which is suitable for dilution with water to produce a dispersion sufficient N-ethyl-p-isothiocyanatobenzenesulphonamide is dissolved in substantially anhydrous acetone containing 1% v./v. of Ethylan C.P. (a polyethylene oxide condensate of octylphenol) to obtain a composition which contains 10% w./v. of active ingredient.

In exactly similar manner compositions may be prepared which contain as active ingredient one of the following compounds.

N-n-propyl-p-isothiocyanatobenzenesulphonamide
N-n-butyl-p-isothiocyanatobenzenesulphonamide
N-n-pentyl-p-isothiocyanatobenzenesulphonamide
N-n-hexyl-p-isothiocyanatobenzenesulphonamide
N-phenyl-p-isothiocyanatobenzenesulphonamide
N:N-dimethyl-p-isothiocyanatobenzenesulphonamide
N:N-diethyl-p-isothiocyanatobenzenesulphonamide
N:N-di-n-propyl-p-isothiocyanatobenzenesulphonamide
N-methyl-N-phenyl-p-isothiocyanatobenzenesulphonamide

EXAMPLE 12

In the preparation of a composition which is suitable for dilution with water to produce a stable emulsion sufficient N-methyl-N-phenyl-p-isothiocyanatobenzenesulphonamide is dissolved in a mixture of 10 parts by volume of Ethylan S.E. (a mixture of lauric diethanolamide and a polyethylene oxide condensate of octylphenol) and 90 parts by volume of benzene to obtain a composition which contains 20% w./v. of active ingredient.

EXAMPLE 13

In the preparation of a composition which is suitable for dilution with water to obtain a stable emulsion sufficient p - isothiocyanatobenzenesulphonpiperidide is dissolved in a mixture of 10 parts by volume of Ethylan S.E. (a mixture of lauric diethanolamide and a polyethylene oxide condensate of octylphenol) and 90 parts by volume of benzene to obtain a solution which contains 10% w./v. of active ingredient.

A similar composition may be prepared using toluene in place of benzene.

We claim:
1. An organic isothiocyanate of the formula

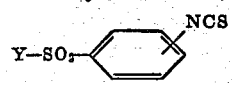

in which Y is a nitrogen-containing radical selected from the group consisting of Z=N— and

wherein Z=N— is selected from the group consisting of piperidyl, lower alkylpiperidyl, pyrrolidyl and tetrahydropyridyl $R_1$ is selected from the group consisting of hydrogen and lower alkyl, and $R_2$ is selected from the group consisting of lower alkyl, lower alkenyl, phenyl lower alkyl, phenyl, lower alkylphenyl, halogenated phenyl and lower alkoxyphenyl.

2. An organic isothiocyanate of the formula

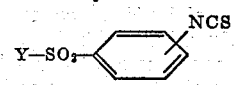

in which Y is piperidyl.

3. An organic isothiocyanate of the formula

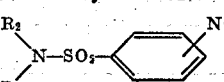

in which $R_1$ is a hydrogen atom and $R_2$ is lower alkyl.

4. An organic isothiocyanate of the formula

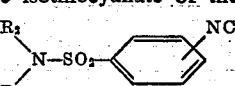

in which $R_1$ is lower alkyl and $R_3$ is phenyl.

5. An organic isothiocyanate of the formula

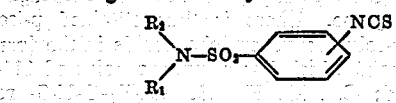

in which $R_1$ and $R_2$ each represent lower alkyl.

6. p-isoThiocyanatobenzenesulphonpiperidide.
7. N - methyl - N-phenyl - p - isothiocyanatobenzenesulphonamide.
8. N-isopropyl-p-isothiocyanatobenzenesulphonamide.
9. N-n-butyl-p-isothiocyanatobenzenesulphonamide.
10. N-(4 - methylpentyl) - p - isothiocyanatobenzenesulphonamide.
11. p - isoThiocyanatobenzenesulphon - 4 - methylpiperidide.

References Cited in the file of this patent
UNITED STATES PATENTS

| | | |
|---|---|---|
| 2,042,600 | Hilger et al. | June 2, 1936 |
| 2,339,050 | Carson | Jan. 11, 1944 |
| 2,370,405 | Kaase | Feb. 27, 1945 |
| 2,394,915 | Jones | Feb. 12, 1946 |
| 2,428,843 | Georges | Oct. 14, 1947 |
| 2,517,760 | Bost et al. | Aug. 8, 1950 |
| 2,749,268 | Newcomer | June 5, 1956 |
| 2,785,101 | Urbschat | Mar. 12, 1957 |
| 2,785,190 | Klopping | Mar. 12, 1957 |

FOREIGN PATENTS

| | | |
|---|---|---|
| 481,733 | Great Britain | Mar. 11, 1938 |
| 517,682 | Great Britain | Feb. 6, 1940 |
| 753,171 | Great Britain | July, 1956 |
| 210,833 | Switzerland | Nov. 1, 1940 |

OTHER REFERENCES

McKee: J.A.C.S., vol. 68, pp. 2506–7 (1946).